United States Patent
Karimi et al.

(10) Patent No.: US 7,254,884 B2
(45) Date of Patent: Aug. 14, 2007

(54) METHOD FOR FABRICATING A POLE TIP IN A MAGNETIC TRANSDUCER USING FEED-FORWARD AND FEEDBACK

(75) Inventors: Negar Karimi, San Jose, CA (US); John I. Kim, San Jose, CA (US); Andrew Crehan Walker, Carmel, CA (US); Yeak-Chong Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 430 days.

(21) Appl. No.: 10/946,412

(22) Filed: Sep. 20, 2004

(65) Prior Publication Data

US 2006/0059680 A1    Mar. 23, 2006

(51) Int. Cl.
G11B 5/127 (2006.01)
H04R 31/00 (2006.01)

(52) U.S. Cl. ............... 29/603.09; 29/603.1; 29/603.13; 29/603.15; 29/603.16; 29/603.18; 216/62; 216/65; 216/66; 216/67; 360/126; 360/317; 451/5; 451/41

(58) Field of Classification Search ............ 29/603.09, 29/603.1, 603.13–603.16, 603.18; 216/62, 216/65–67; 360/126, 317; 451/5, 41
See application file for complete search history.

(56) References Cited

U.S. PATENT DOCUMENTS

| 4,592,801 A * | 6/1986 | Hara et al. ............... 216/22 |
| 5,267,112 A * | 11/1993 | Batra et al. ............ 360/119 |
| 6,180,421 B1 * | 1/2001 | Futai et al. .............. 438/3 |
| 6,723,252 B1 * | 4/2004 | Hsiao et al. ............. 216/22 |
| 2003/0043504 A1 | 3/2003 | Dinan et al. |
| 2003/0135987 A1 | 7/2003 | Kruger et al. |
| 2003/0137771 A1 | 7/2003 | Santini |
| 2003/0223150 A1 | 12/2003 | Lee |
| 2004/0001282 A1 | 1/2004 | Dinan et al. |
| 2004/0066577 A1 | 4/2004 | Hsiao et al. |

* cited by examiner

Primary Examiner—Paul D Kim
(74) Attorney, Agent, or Firm—G. Marlin Knight

(57) ABSTRACT

Methods for fabricating pole piece tips for a magnetic transducer are disclosed. The ion-milling operations for trimming P2 and notching P1 are controlled using feed-forward and feedback. The preferred method of the invention includes steps for setting four time values used in different phases of the ion-milling process based on feed-forward and feedback of measured values including the P2 width measured in the mask, multiple P2B measurements and measurement of the notch depth.

17 Claims, 5 Drawing Sheets

METHOD FOR FABRICATING A POLE TIP IN A MAGNETIC TRANSDUCER USING FEED-FORWARD AND FEEDBACK

FIELD OF THE INVENTION

The invention relates to the field of magnetic transducers (heads) having inductive write heads and more particularly to the process for making the pole pieces for the write head and even more particularly to methods for controlling ion-milling times used in the process of making the pole pieces.

BACKGROUND OF THE INVENTION

In a typical prior art magnetic disk recording system a slider containing magnetic transducers for reading and writing magnetic transitions flies above the disk while it is being rotated by a spindle motor. The disk includes a plurality of thin films and at least one ferromagnetic thin film in which the recording (write) head records the magnetic transitions in which information is encoded. The magnetic domains in the media on can be written longitudinally or perpendicularly. The shape and size of the pole piece tips at the ABS and any shields are the primary factors in determining the track width. The read and write elements of the head (also called a slider) are built-up in layers on a wafer using thin film processing techniques to form a large number of heads at the same time. FIG. 1 illustrates the prior art relationships between the P2 pole piece tip P2T and the P1 before P1 is milled using P2T as a mask. The section taken is perpendicular to the wafer surface. Only one set of head structures is shown. The thin film for P1 is deposited first followed by the thin film for the gap layer.

FIG. 2 is an illustration of the shape of P1 after ion-milling. The surface of P1 has been milled to form a tip under the gap. The surface of P1 slopes away from the tip. The distance from interface of the gap and P1 to the recessed beveled surface is called the "notch depth". The process of creating the P1 tip is also called notching. The width of the P1 tip at the gap is called the P1A width. The width of the P2 tip at the gap is called the P2B width. The P1A and P2B dimensions of write pole pieces within the head are critical parameters to the areal density of recording head structures. The view shown in FIGS. 1 and 2 shows the write gap. The track width view (not shown) is perpendicular to the write gap view.

Multiple Ion Mill process steps are used to perform track width trim and P1 notching to control the unique multidimensional structure of the write pole tips. The ion-milling process uses a high voltage source to ionize low pressure gasses, accelerating and neutralizing them through an acceleration grid, creating a nearly neutral beam of atoms which bombards a wafer within the chamber removing material by kinetic or chemical processes. The trimming of track width of pole P2B is achieved by 60°/70° degree ion milling and the P1 notch is defined by 35° to 45° notching of P1 using P2T as a mask. P2B, P1A, (P1A-P2B) and P1 Notch Depth are the critical dimensions of the write pole (P1 and P2) structure. It is very challenging to control all these critical dimensions and achieve a specific design specification. In order to improve critical dimensions control, advanced process control (APC) has been implemented for ion-milling processes. The prior art process control uses feed forward and feedback information to control individual ion-milling steps. Traditional process control methods assume the steps are independent from each other.

Conventionally after the basic structures for the heads have been formed the individual heads rows of heads) are cut from the wafer to expose what will become the air-bearing surface after further processing. The processing of the air-bearing surface typically includes lapping and formation of air-bearing features typically called rails.

FIG. 3 is a block diagram showing selected hardware used in a prior art plating and ion-milling process. The metals used for the pole pieces are deposited by plating. Various precision measurement equipment are used to make measurements at selected stages of the process. Examples include commercially available photolithography measurement tools such as a scanning electron microscope (CD-SEM) made by KLA-Tencor and generic Focused-Ion Beam tools. The measurements are typically made at selected sample sites on the wafer, rather than attempting to measure all of individual heads. The process is automated by connecting the measurement tools and the process equipment to one or more computers which can include a server which integrates data and control over a wide range of process stages and a personal computer which is dedicated to the pole piece tip processing.

FIG. 4 is a flowchart illustrating a prior art process for fabricating the P2T and notching P1. The seed layer for P2 is deposited first 40. A standard photolithography mask is applied and patterned on the wafer for P2 41. The width of P2, which is a critical dimension of the mask, is measured using commercially available tools 42. The metal for P2 is deposited by a plating process 43. The critical dimensions of the P2T are measured 44. A first ion-milling sweep or full rotation milling is performed to remove the seed layer for P2 45. Further ion-milling performs the rough trimming of P2 46. The critical dimensions of the P2T are measured 47 using a FIB tool. An ion-milling sweep or full rotation milling is performed to rough trim 48 and to notch P1 49. The critical dimensions are measured again 50 using a tungsten FIB tool. An ion-milling sweep or full rotation milling is performed to fine trim the P2B 51. The final dimensions of P2T are measured 52. The process proceeds with the deposition of the D2 seed layer 53 which is the copper seed layer for an additional coil layer that is formed in the next phase of the process. The final dimensions of P2B are measured 54 using a FIB tool.

The dotted lines in FIG. 4 represent information flow in the form of feedback and forward. The information gathered in the step of measured P2T 44 is fed forward 61 for use in the ion-milling for notching P1 49. The FIB measurement 47 is fed forward 62 to second ion-milling step to rough trim P2 48. The ion-milling for notching P1 49 also receives feedback information from 63 from the final P2T measurement 52. The measurement at step 50 is fed forward 64 to fine trimming step for P2B 51. The final P2B measurement 54 is fed back 65 to fine trimming step for P2B 51 as well, but typically by manual adjustment.

Selected prior art steps have been omitted from FIG. 4 to simplify the illustration. The P2 photoresist mask is stripped after P2 is plated. A resist to protect features during subsequent milling is patterned after the first P2B measurement step 47. The protective resist is stripped after last fine trimming step 51. There are other processing steps related to the D2 seed deposition 53 which are unrelated to the subject of the application.

In published U.S. patent application 2003/0223150 by Edward Lee a method of protecting the front P2 pole tip during the ion mill patterning of the yoke is described. A front connecting pedestal is electroplated over the front P2 pole tip slightly behind the ABS, and a back gap connecting pedestal is electroplated over the back gap P2 pedestal. Insulator materials are formed over the front P2 pole tip, over the front connecting pedestal, and in between the front and the back gap connecting pedestals. Next, a chemical-mechanical polishing (CMP) is performed over the top of the structure to form a substantially planar top surface. A full-film of yoke layer materials is then sputter deposited over this top surface, followed by the formation of a photoresist mask slightly behind the ABS. When the yoke layer materials are subsequently ion milled to form the yoke, the front P2 pole tip is protected by the surrounding insulator. The front and back gap connecting pedestals form an intervening magnetic layer which connects the front P2 pole tip and back gap P2 pedestal to the yoke.

In published U.S. patent application 20030137771 by Hugo Santini a method of ion milling pole tips in a longitudinal write head is described. Photoresist is spun patterned to form a mask for ion milling to notch the bottom first pole tip layer adjacent first and second side edges of the top first pole tip layer.

SUMMARY OF THE INVENTION

Applicant discloses a method for fabricating pole piece tips for a magnetic transducer. The ion-milling operations for trimming P2 and notching P1 are treated as interrelated process steps in the process control method according to the invention. Based on understanding of the combined effect of these operations, prediction models are setup using feed-forward and feedback data in each operation to minimize variation of the final write pole (P1 and P2) multidimensional structure. The preferred method of the invention includes steps for setting four time values used in different phases of the ion-milling process based on feed-forward and feedback of measured values. These four adjustments can be made independently; therefore, an implementation need not have all four. The first of these times T1 is for the first rough trimming of P2. The T1 time is adjusted using feed-forward of the P2 width measured in the mask before milling and feedback of the P2B value measured after the first rough milling. The T1 is varied positively with the measured P2 width minus the target P2 width. If the P2 width increases, T1 increases. Likewise variations in P2B in relation to a selected target value increase or decrease T1 directly. The second time T2 is for the second rough trimming of P2. The T2 time is positively adjusted using feed-forward of the P2B value measured after the first rough milling and feedback of the P2B value measured after the second rough milling. The third time T3 is for the notching of P1. The T3 time is adjusted inversely using feed-forward of the T1 value and directly using feedback of the P1 notch depth value measured after the notching step. The fourth time T4 is for the fine trimming of P2B. The T4 time is adjusted positively using feed-forward of the measured P2 width of the mask and feed-forward of the P2B value measured after the notching step.

Alternative embodiments include setting time T3 for notching P1 using the P2 width from the mask measurement.

DETAILED DESCRIPTION OF THE INVENTION AND THE PREFERRED EMBODIMENTS

It is conventional for thousands of heads to be manufactured simultaneously on a single wafer. For simplicity the following will describe the actions or structures for a single head, but it is to be understood that the process steps are performed over the entire wafer and are, therefore, forming structures for thousands of heads simultaneously. The invention relates to the write head portion of the magnetic transducer and does not place limits on the type of read head that can be used with it. Typically the read head portion of the transducer is fabricated first, but transducers with the write head portion fabricated first are feasible. A write head according to the invention may be fabricated before or after the read head portion of the transducer.

The relative sizes of the components shown in the figures are not presented according to scale, since the large range of sizes would make the drawings unclear. The relative sizes/thickness of the components are according to prior art principles except where noted below.

Figure 1:
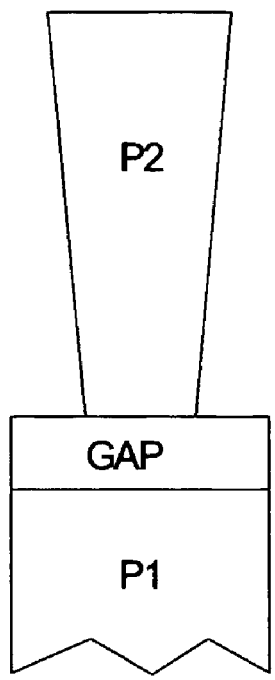
FIG. 1 is an illustration of section of a wafer on which magnetic heads are being fabricated according to the prior art. At the stage shown P2 has been patterned and is ready for ion-milling. The section is taken perpendicular to the wafer surface.
Figure 2:
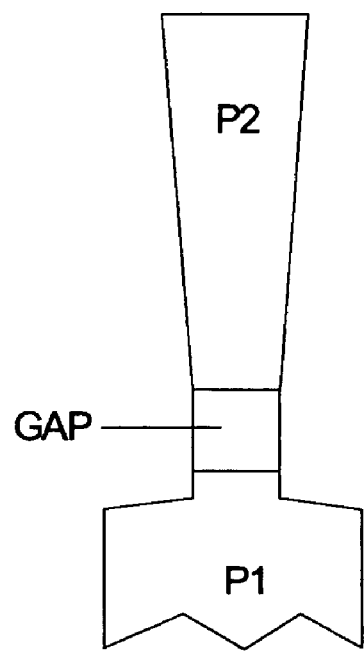
FIG. 2 is an illustration of section of the wafer of FIG. 1 after ion-milling has been completed to trim P2 and notch P1. The section is taken perpendicular to the wafer surface.
Figure 3:
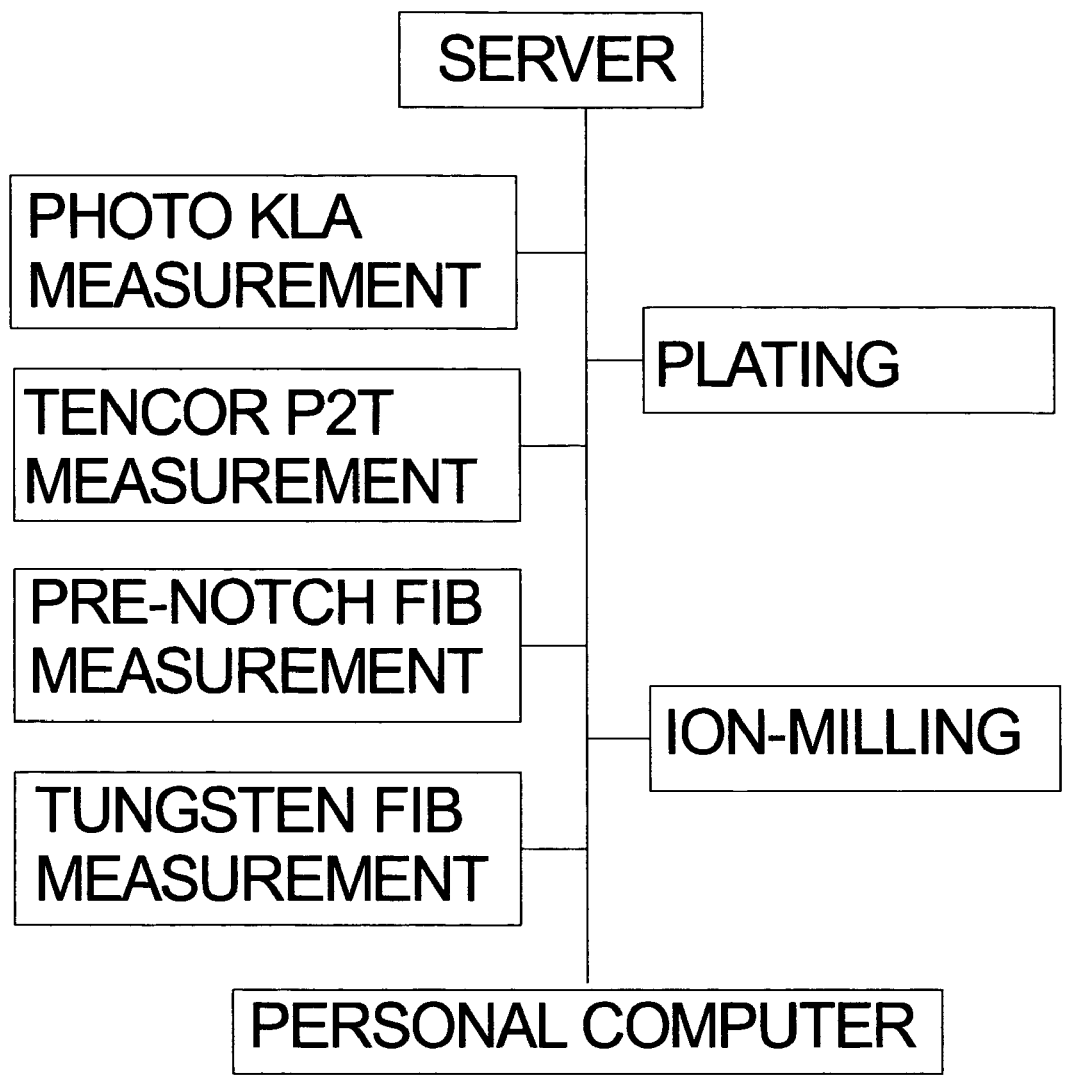
FIG. 3 is a block diagram showing selected hardware used in a prior art to plate P2 and ion-milling P2 and P1.

The invention can be implemented using prior art hardware like that illustrated in FIG. 3 with appropriate modifications in the software. The personal computer can be used to control the process, gather the measurement data, perform the calculations, and implement the feedback and feed-forward data flows. Various software packages for process control are commercially available which can provide a tool set for implementing the invention. The commercially available measurement, deposition, plating, ion-milling machines are designed for incorporation into an automated process, so each has built-in means for accepting commands from a computer and supplying data back to the computer.

Based on understanding of the combined effect of the various operations in the overall process, prediction models are setup using feed-forward and feedback data in each operation to minimize variation of the final write pole (P1 and P2) multidimensional structure. The feed-forward data affects the processing of the wafer on which the measurements are made. Feedback data affects the next wafer's processing.

Figure 4:
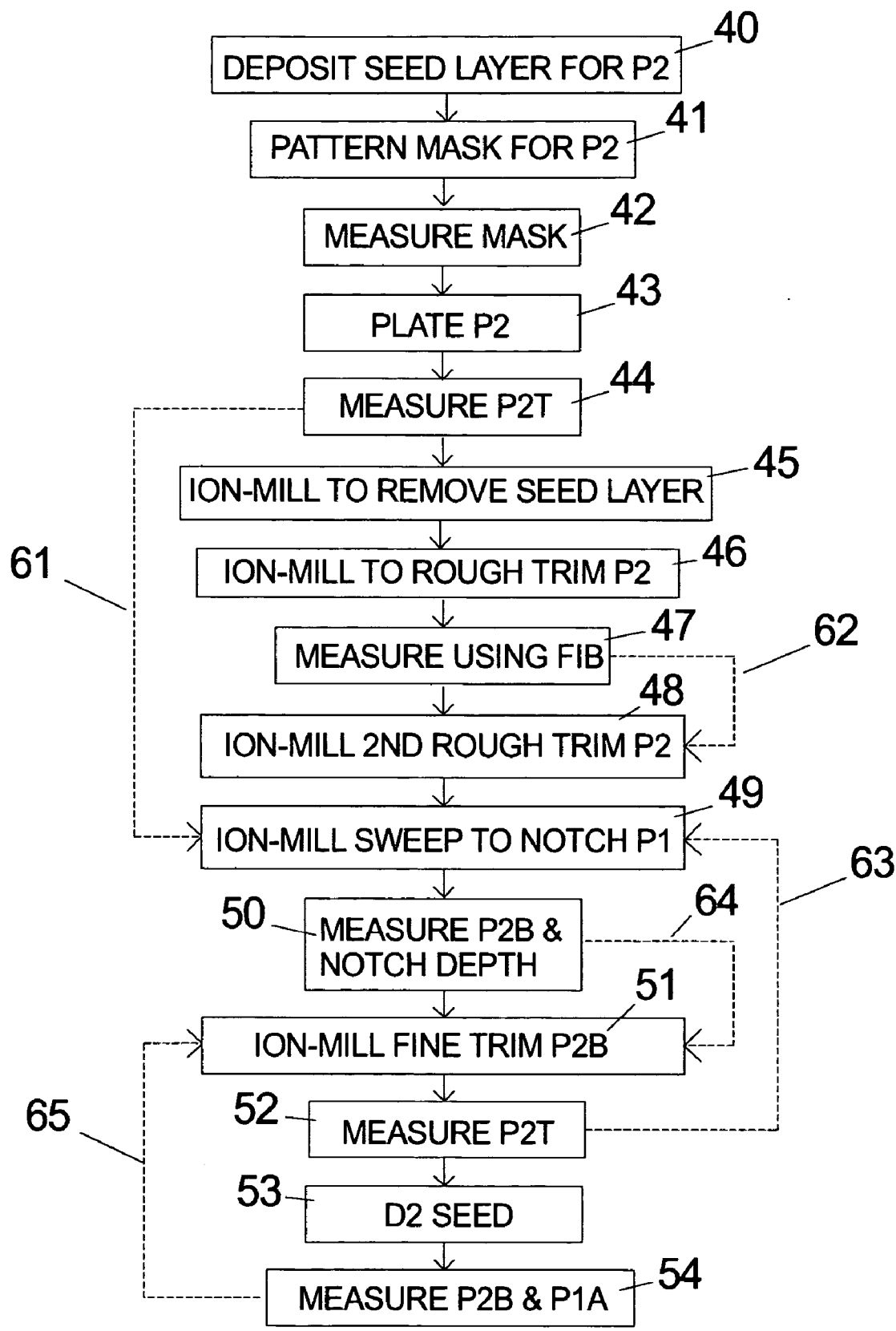
FIG. 4 is a flowchart showing selected processing steps in the prior art to plate P2 and ion-milling P2 and P1. The feed-forward and feedback data flows are shown as dotted lines.
Figure 5:
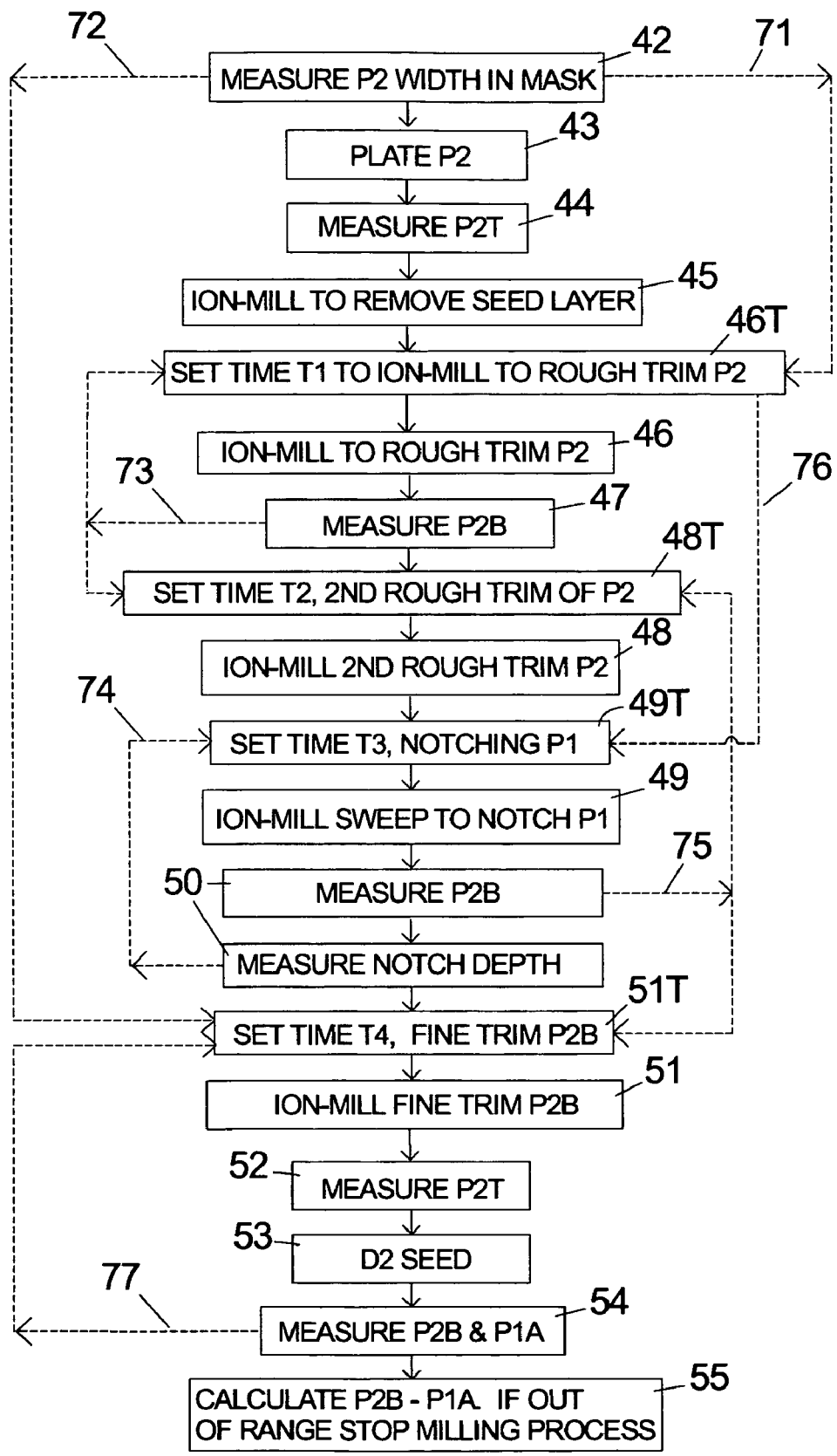
FIG. 5 is a flowchart showing selected processing steps in an embodiment of the method according to the invention to plate P2 and ion-milling P2 and P1. The feed-forward and feedback data flows are shown as dotted lines.

Reference is made to FIG. 5 to begin the description of a first embodiment of the invention. FIG. 5 is a flowchart showing selected processing steps in an embodiment of the method according to the invention to plate P2 and ion-milling P2 and P1. The feed-forward and feedback data flows added are shown as dotted lines. The step of depositing the seed layer 40 and patterning the mask 41 shown in FIG. 4 are also executed in the method according to the invention, but have been omitted from FIG. 5 for simplification. Four additional steps are shown for setting ion-milling times. The setting of these times is preferably performed by the personal computer, but could be performed by the server. There is an additional step for setting the ion-milling time T1 for first rough trimming of P2 46T. There is an additional step for setting the ion-milling time T2 for second rough trimming of P2 48T. There is an additional step for setting the ion-milling time T3 for the notching of P1 49T. There is an additional step for setting the ion-milling time T4 for fine trimming of P2B 51T. The process according to the invention measures the width of P2 in the pattered P2 mask 42 as in the prior art; however, unlike the prior art, the embodiment of the method shown in FIG. 5 uses feed-forward 71, 72 of the P2 width into the calculation of the ion-milling times T1 for the first rough trimming of P2 46T and T4 for fine trimming P2B 51T. The P2 width measurements of the mask are made with a commercially available tool such as a KLA CD-SEM.

The step of setting the ion-milling time T1 for the first rough trimming of P2 46T obtains feedback data 73 from the P2 width measurement at step 47 in the process. The time setting step 46T uses the P2 width measurement fed forward from step 42. The first phase of the calculation uses of the following relationship:

$$Tx = T1\_init + (KLA\ Mean - KLA\ target)/First\ Trim\ Rate$$

where:
T1_init=initial nominal first trim time
KLA_Mean=the mean of the measured width of P2 in the mask for selected sites
KLA target=an empirically selected target value for the P2 mask width The KLA_Mean value is obtained in step 42. The P2 width for a selected set of heads on the wafer. The number of sites to check is not critical so long as a representative sample is obtained. Each of the measurement values used in the feed-forward and feedback according to the invention are measured at multiple sites on the wafer and averaged.

The first pass nominal trim time Tx is then adjusted based on feedback of the P2B measurement in step 47 of the previous wafer which is normally performed by FIB. The P2B measurement feedback adjustment is:

$$T1_{new} = Tx + Lambda \times (FIB\_measurement\_P2B - P2B\_target)$$

where:
T1_new=new nominal first rough trim time for the next wafer
Lambda=scaling factor
P2B_target=an empirically selected target value Lambda is and is an empirically determined scaling factor usually between 0.1 to 0.3; therefore, multiplying by it scales the amount of the adjustment time resulting from the feedback. The P2B_target value is empirically determined depending on the specifics of the particular product, but a reasonable value is from 0.2 to 0.35 um. The calculated time in step 46T is fed-forward 76 to step 49T for calculating the ion-milling time for notching P1.

The calculation of the ion-milling time T2 for the second rough trimming of P2 in step 48T uses feedback 75 from the measurement of P2B in step 50. The P2B measurements are typically done by FIB. Feed-forward of the P2B measurement from step 47 is also used. The calculation includes the use of the following relationship:

$$T2x = T2\_init + (FIB1\_measurement - FIB1\_target)/Second\_Trim\_Rate$$

where:
T2 init=initial second nominal rough trim time
FIB1 target=an empirically selected target value for the mask The feedback from the measurement of P2B in step 50 is used to adjust the T2x value as follows:

$$T2\ new = T2x + Lambda2 \times (FIB2\ measurement\ P2B - FIB2\ P2B\ target)$$

where:
T2_new=new second nominal rough trim time
Lambda2=scaling factor

Lambda2 is a scaling factor usually between 0.1 and 0.25 and is empirically determined.

Figure 6:
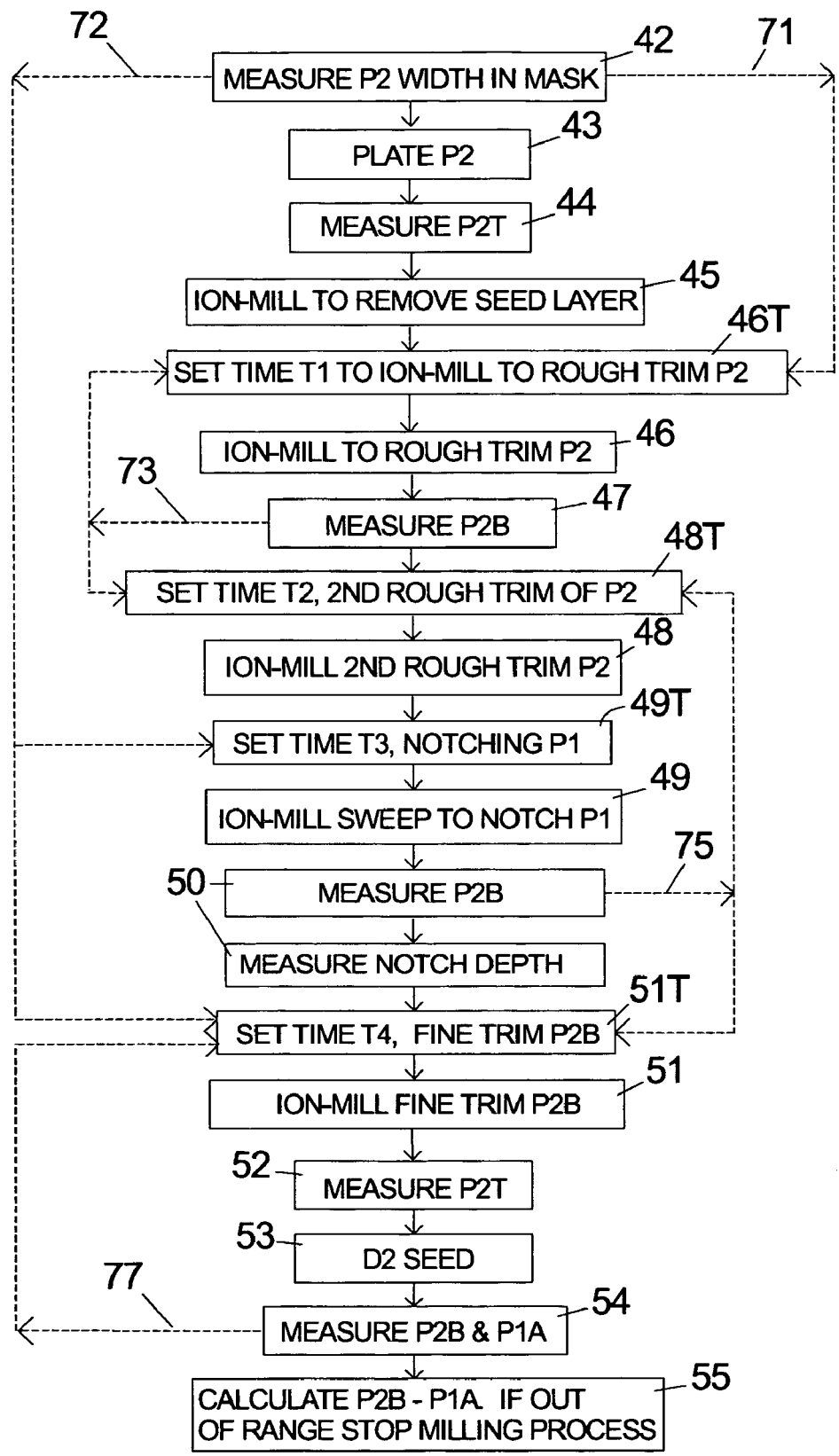
FIG. 6 is a flowchart showing selected processing steps in an alternative embodiment of the method according to the invention to plate P2 and ion-milling P2 and P1. The feed-forward and feedback data flows are shown as dotted lines.

The calculation in step 49T of the notch depth milling time T3 can be derived in two ways. One way illustrated in FIG. 6 uses of feed-forward of the P2 width measurement from step 42 as follows:

$$T3 = (Notch\_Depth\_Target + (KLA\_Target - KLA\_Mean))/Notch\_Etch\_Rate$$

where:
KLA_Mean=the mean of the measured width of P2 in the mask for selected sites
KLA_Target=an empirically selected target value for the P2 mask width
Notch_Etch_Rate=Notch Depth from step 50 divided by T3.

The KLA_Mean has a negative sign in this equation, so it has an inverse effect on T3. When the KLA P2 width measurement is above the target, the T3 notching time is reduced to less than the nominal value. The KLA P2 width measurement positively affects T1 which reduces the needed T3 time.

The method illustrated in FIG. 5 uses feed-forward of time T1 from step 46T as follows:

$$T3 = Nominal\ Notch\ Depth\ Time + Lambda3 \times (T1\_New - T1\_init)$$

where:
T1_init=actual trim time for this wafer
Lambda3=scaling factor

The T1_init is the actual trim time used, before the adjustment, and has a negative sign in the calculation. Thus, the lower the T1 trim time for a wafer, the more notching time is required at T3. The lambda3 scaling is empirically determined. A reasonable value is 0.25.

The calculation of the time T3 in step 49T also uses feedback 74 from the notch depth measurement in step 50. In an alternative embodiment the thickness of P2 can be measured and used to positively adjust T3.

The step of setting the ion-milling times T4 for the fine trimming of P2B 51T uses feed-forward data 72 of the P2 width in the mask which is measured in step 42. Also used is the measurement of P2B at step 50 in the process. The T4 trimming time is increased when the KLA measured value for a wafer is lower than the target. The final trim time T4 is initially calculated by using the following:

$$T4 = (FIB2\_measurement - final\_FIB\_target - (KLA\_Mean - KLA\_Target))/Fine\_Trim\_Rate$$

where:
FIB2 measurement=the P2B value from step 50
KLA_Mean=the mean of the measured width of P2 in the mask for selected sites
KLA_Target=selected target value for KLA_Mean The Fine_Trim_Rate is a variable that is checked from feedback 77 and testing of the actual rate vs. predicted rate. If it is out of a selected range, then flags are raised.

The step of calculating the difference between P2B and P1A (P2B–P1A) is included in step 55 which also compares the result to permissible range or threshold values and stops the milling process at a selected stage if the value is out of range. The preferred stopping point is step 48T or 48 before the second ion-milling for rough trimming P2 is performed.

Other variations and embodiments according to the invention will be apparent to those skilled in the art which will nevertheless be with the spirit and scope of the invention.

What is claimed is:

1. A method of fabricating a thin film magnetic head comprising the steps of:
   patterning a photolithographic mask for a P2 pole piece on a wafer;
   measuring a P2 width in the photolithographic mask;
   depositing a thin film for P2 over the wafer;
   setting a new time T1 for a first rough trimming of P2 using positive feed-forward of the P2 width in the photolithographic mask to adjust a previous value of T1; and
   milling the wafer for the new time T1.

2. The method of claim 1 further comprising the step, executed after the step of setting a new time T1, of measuring a first P2B width and wherein the step of setting a new time T1 further comprises using feedback of the first P2B width to positively adjust new time T1.

3. The method of claim 2 further comprising the steps, executed after the step of measuring the first P2B width, of setting a new time T2 for a second rough trimming operation of P2 using feed-forward of the first P2B width to positively adjust new time T2 and milling the wafer for time T2.

4. The method of claim 3 further comprising the steps, executed after the step of setting a new time T2, of setting a new time T3 for notching a P1 pole piece, which was deposited prior to P2, using feed-forward of the time T1 to inversely adjust new time T3.

5. The method of claim 4 further comprising the steps, executed after the step of setting a new time T3, of measuring a second P2B width; measuring a notch etch depth and setting a new time T4 for a fine trimming operation using feed-forward of the second P2B width to positively adjust new time T1 and milling the wafer for new time T4.

6. The method of claim 5 wherein the step of setting the new time T4 further comprises using feed-forward of the P2 width in the photolithographic mask to positively adjust the new time T4.

7. The method of claim 5 further comprising the steps, executed after the step of milling the wafer for new time T4, of measuring P2B and P1A, and temporarily stopping the execution of the method if the difference between P2B and P1A exceeds a threshold.

8. A method of fabricating a thin film magnetic head comprising the steps of:
   patterning a photolithographic mask for a P2 pole piece on a wafer;
   measuring a P2 width in the photolithographic mask;
   depositing a thin film for P2 over the wafer;
   setting a new time T1 for a first rough trimming of P2 using feed-forward of the P2 width in the photolithographic mask to positively adjust a previous value of T1 and feedback from a first measurement of P2B from a previous wafer to positively adjust a previous value of T1;
   performing the first rough milling the wafer for the new time T1;
   setting a new time T2 for a second rough trimming of P2 using feed-forward of a P2B width measured after the first rough milling the wafer to positively adjust a previous value of T1 and feedback from a second measurement of P2B from a previous wafer to positively adjust a previous value of T2; and
   performing the second rough milling the wafer for the new time T2.

9. The method of claim 8 further comprising the steps, executed after the step of performing the second rough milling, of setting a new time T3 for notching a P1 deposited prior to P2 using feed-forward of time T1 to negatively adjust the new time T3 and feedback of a measurement of a notch depth for a previous wafer to positively adjust the new time T3.

10. The method of claim 9 further comprising the steps, executed after the step of setting a new time T3, of setting a new time T4 for a fine trimming operation using feed-forward of the second P2B width to positively adjust new time T1 and using feed-forward of the P2 width in the photolithographic mask to positively adjust the new time T4; and milling the wafer for new time T4.

11. The method of claim 10 further comprising the steps, executed after the step of milling the wafer for new time T4, of measuring P2B and P1A, and temporarily stopping the execution of the method if the difference between P2B and P1A exceeds a threshold.

12. A method of fabricating a thin film magnetic head comprising the steps of:
   depositing a thin film for P1 over a wafer;
   depositing a thin film for a gap layer over the wafer;
   patterning a photolithographic mask for a P2 pole piece on a wafer;
   measuring a P2 width in the photolithographic mask;
   depositing a thin film for P2 over the wafer;
   performing at least a first rough milling of P2 for time T1 using the P2 width in the photolithographic mask to positively adjust the time T1;
   performing a milling operation on the wafer for time T3 to notch P1; and
   performing a milling operation on the wafer for time T4 to fine trim P2B using the P2 width in the photolithographic mask to negatively adjust the time T4.

13. The method of claim 12 further comprising the steps of:
   measuring a first value for P2B after the first rough milling of P2; and
   setting time T1 using feedback of the first value for P2B to positively adjust the time T1.

14. The method of claim 13 further comprising the step of setting time T3 using feed-forward of time T1 to negatively adjust T3.

15. The method of claim 13 further comprising the step of setting time T3 using the P2 width in the photolithographic mask to negatively adjust time T3.

16. The method of claim 13 further comprising the steps of:

measuring a notch depth value after the step of performing a milling operation on the wafer for time T3 to notch P1; and setting time T3 using feedback of the notch depth value to positively adjust the time T3.

17. The method of claim 16 further comprising the steps of:

performing a second rough milling of P2 for time T2 after the first rough milling of P2;

measuring a second value for P2B after the milling operation on the wafer for time T3 to notch P1; and setting time T2 using feed-forward of the first value for P2B to positively adjust the time T2 and using feedback of the second value for P2B to positively adjust the time T2.

* * * * *